Patented July 17, 1923.

1,462,375

UNITED STATES PATENT OFFICE.

GOTTFRIED MEYER, OF VERNDALE, MINNESOTA.

PROCESS OF PREPARING CHEESE.

No Drawing. Application filed July 16, 1922. Serial No. 575,764.

*To all whom it may concern:*

Be it known that I, GOTTFRIED MEYER, a citizen of the United States, residing at Verndale, in the county of Wadena and State of Minnesota, have invented certain new and useful Improvements in a Process of Preparing Cheese; and I do hereby declare the following to be a full, clear, and exact description of the invention, such as will enable others skilled in the art to which it appertains to make and use the same.

In accordance with the present invention cheese that has already been prepared is utilized as the base and is selected according to the flavor and nature of the cheese to be prepared. This already prepared cheese or base is comminuted and mixed with natural milk and heated and constantly stirred until a certain result is obtained, when the excess of milk is drawn off and the resultant mass worked in a manner similar to the pulling of candy and when the proper consistency has been attained, the product is packed in cans for future use. This process results in the production of a cheese having a special and refined texture and which will not change no matter how long it is kept.

In accordance with the present invention, the already prepared cheese or base is comminuted, being preferably ground by machinery and to each two pounds of grated cheese is added one-half pound of natural milk. The milk and cheese are thoroughly mixed and are gradually heated to a temperature of 125° Fahrenheit. The mixture is maintained at this temperature for a period of ten to fifteen minutes and is constantly stirred. After the mixture has been thus treated a change commences to take place and the product assumes a stringy, dough-like or elastic appearance and when this stage is reached, the excess of milk is drawn off and the cheese is worked by being pulled in a manner similar to taffy candy until it reaches the desired consistency. The prepared cheese is now placed in cans and sealed airtight and sterilized at a temperature of 190° Fahrenheit.

Cheese prepared according to this process does not change in texture or flavor and will not spoil or grow strong. It is to be understood that any flavor, such as pimento, may be added according to the nature of the cheese to be prepared.

It should be stated that cream or butter may be substituted for the milk so that under certain conditions milk, cream or butter may be used according to the nature of the product to be produced.

What is claimed is:

1. The process of preparing cheese which consists in adding natural milk to already prepared cheese as a base, then mixing and heating the cheese and milk until the same assumes a stringy, dough-like or elastic appearance, then drawing off the excess of milk and subsequently working the product until the same assumes the required consistency.

2. The process herein described of preparing cheese which consists in comminuting already prepared cheese as a base, then adding natural milk thereto and gradually heating the mixture and constantly stirring the same until the product assumes a stringy condition, after which the excess of milk is drawn off and the product worked by being pulled until it acquires the proper consistency.

3. The herein described process of preparing cheese which consists of comminuting already prepared cheese as a base, then adding natural milk thereto, then gradually heating the mass and constantly stirring the same until the product assumes a stringy, dough-like or elastic condition, and working the product by pulling until it assumes the proper consistency, then placing the product in cans which are sealed airtight and sterilized.

In testimony whereof I affix my signature in presence of two witnesses.

GOTTFRIED MEYER.

Witnesses:
J. H. MARK,
C. P. WHITE.